Dec. 26, 1933.  A. E. BLACKMAN  1,941,126
MEDICINE CABINET
Filed Feb. 12, 1931   3 Sheets-Sheet 1

INVENTOR
Albert E. Blackman
BY
Emanuel Scheyer
ATTORNEY

Dec. 26, 1933.  A. E. BLACKMAN  1,941,126
MEDICINE CABINET
Filed Feb. 12, 1931   3 Sheets-Sheet 2
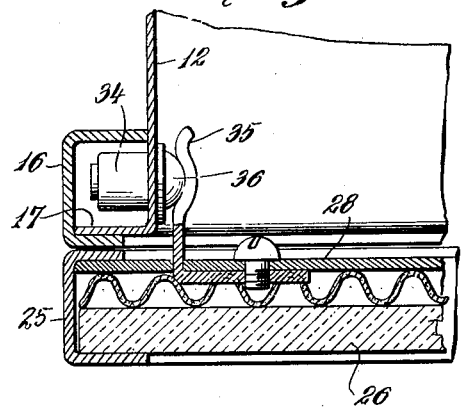
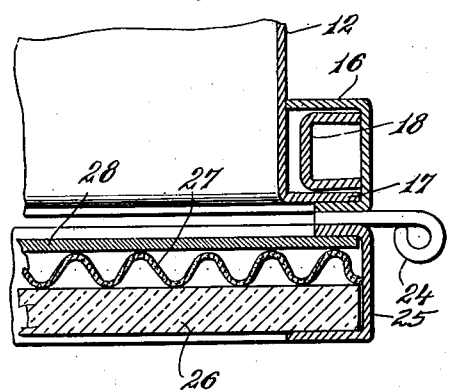
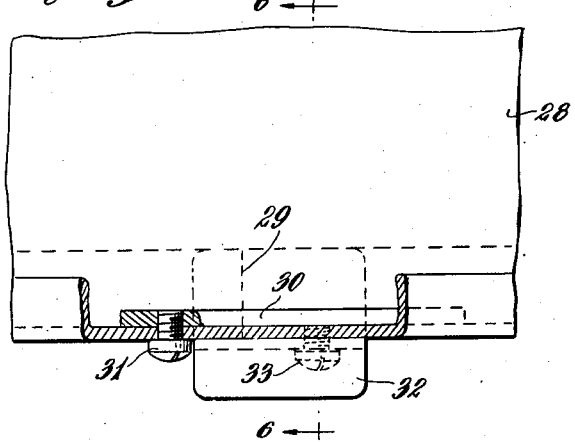
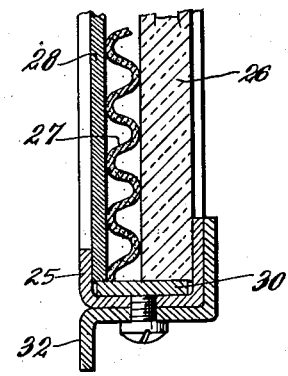
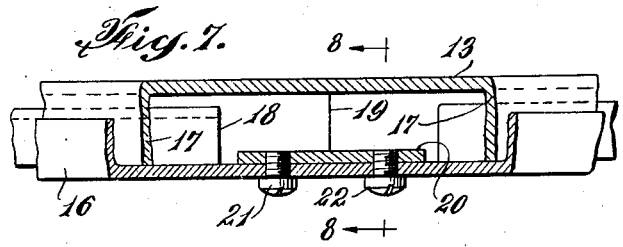
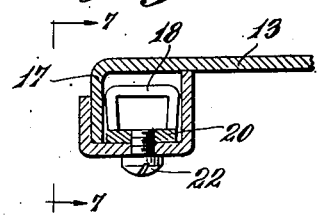
INVENTOR
*Albert E. Blackman.*
BY
*Emanuel Scheyer.*
ATTORNEY Dec. 26, 1933.  A. E. BLACKMAN  1,941,126
MEDICINE CABINET
Filed Feb. 12, 1931  3 Sheets-Sheet 3
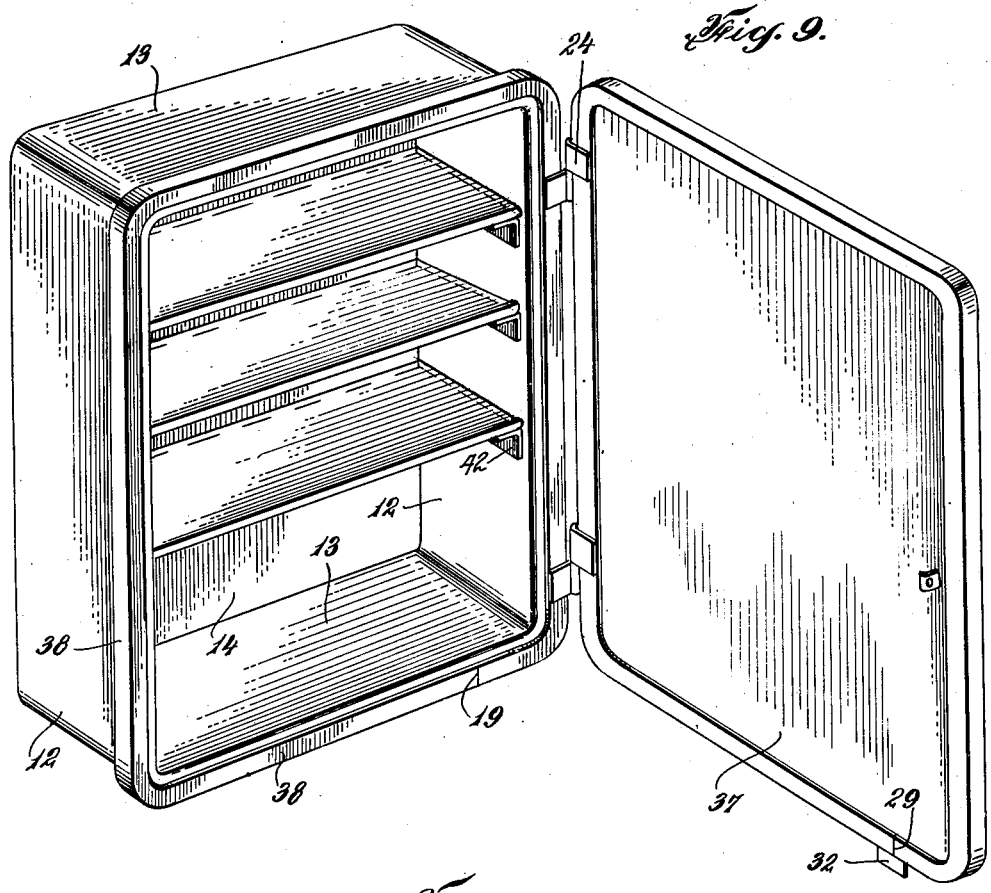
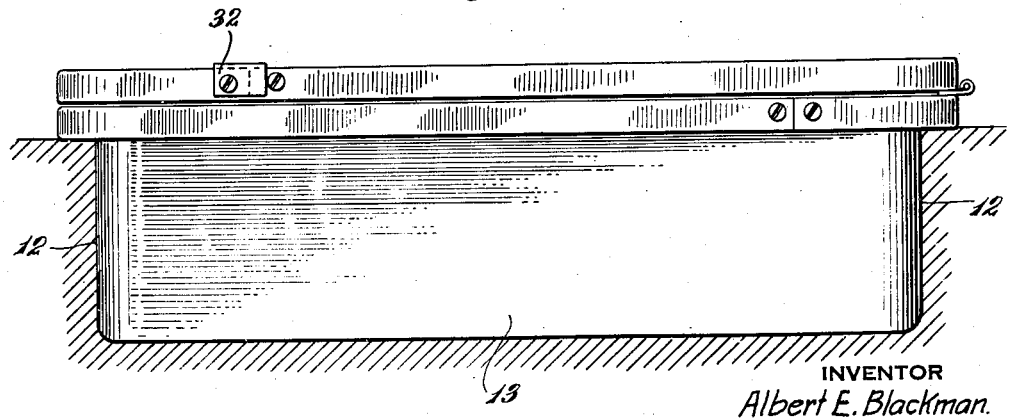
INVENTOR
Albert E. Blackman.
BY
Emanuel Scheyer.
ATTORNEY Patented Dec. 26, 1933

1,941,126

UNITED STATES PATENT OFFICE 1,941,126

MEDICINE CABINET

Albert Edgar Blackman, Mount Vernon, N. Y.

Application February 12, 1931. Serial No. 515,206

8 Claims. (Cl. 312—112)

This invention relates to metallic medicine cabinets and has for objects simplicity of construction and ease of assembling. A further object relates to the construction of the beads upon the cabinet. The beads are made separately from the cabinet and then assembled or clamped thereon. This permits them to be of different material from the body of the cabinet or to have a different finish, such as chromium or nickel plating. The last mentioned object is not readily accomplished in medicine cabinets of present manufacture where the bead is welded to the body of the cabinet or where the bead in part is pressed up from the body of the cabinet and in part formed by means of a strip welded to the part turned up. This building up by welding is necessary because of manufacturing difficulties in pressing out a cabinet with re-entrant flanges to form the beads. Another important advantage of having the beads made separately and then clamped to the body of the cabinet, is that the body of the cabinet can successfully be given a porcelain enamel finish. It is a characteristic of porcelain enamel finish, that it can only be successfully applied to metal of uniform thickness. When the metal is not of uniform thickness, the enamel cracks and chips off as it cools, the enamel usually being applied at a temperature of about 2000 degrees Fahrenheit. In the present type cabinets, good porcelain enameling is difficult because where the bead is made up by welding or fastened to the cabinet by welding, at the place of welding, the metal is of different thickness from the rest of the cabinet. The same is true where the hinges or other parts are welded to the cabinet. In the construction of the present invention, all parts of the cabinet which are formed integrally or of one piece, which are to have a porcelain finish, are the same thickness throughout. Said body which is preferably given a porcelain enamel finish has no lugs welded to it, such as shelf brackets, and the hinges are welded to the bead which is not integral with the body but separately attached thereto. Where the hinges are welded to the beads, finish for the beads other than porcelain enamel is used such as chromium plate. In case the finish for the beads is to be of porcelain enamel, the hinges are fastened to said beads by screws or other equivalent means.

Other objects and advantages will become apparent upon further study of the description and drawings, in which:—

Fig. 3 is a partial sectional view showing the lower left hand corner of Fig. 2 to an enlarged scale.

Fig. 4 is a partial sectional view showing the lower right hand corner of Fig. 2 to an enlarged scale.

Fig. 5 is a partial front elevation of the door at the door pull to an enlarged scale with parts broken away to show the splice plate.

Fig. 6 is a section taken along line 6—6 of Fig. 5 with the broken away parts restored.

Fig. 7 is a partial front elevation, to an enlarged scale, of the lower front edge of the cabinet at the splice in the bead with parts broken away to show the splice plate and spacing channel.

Fig. 8 is a section taken along line 8—8 of Fig. 7 with the broken away parts restored.

Fig. 9 is a perspective view with the door open of a recess type medicine cabinet for flush mounting.

Fig. 10 is a bottom plan view of the cabinet of Fig. 9.

Figure 1:
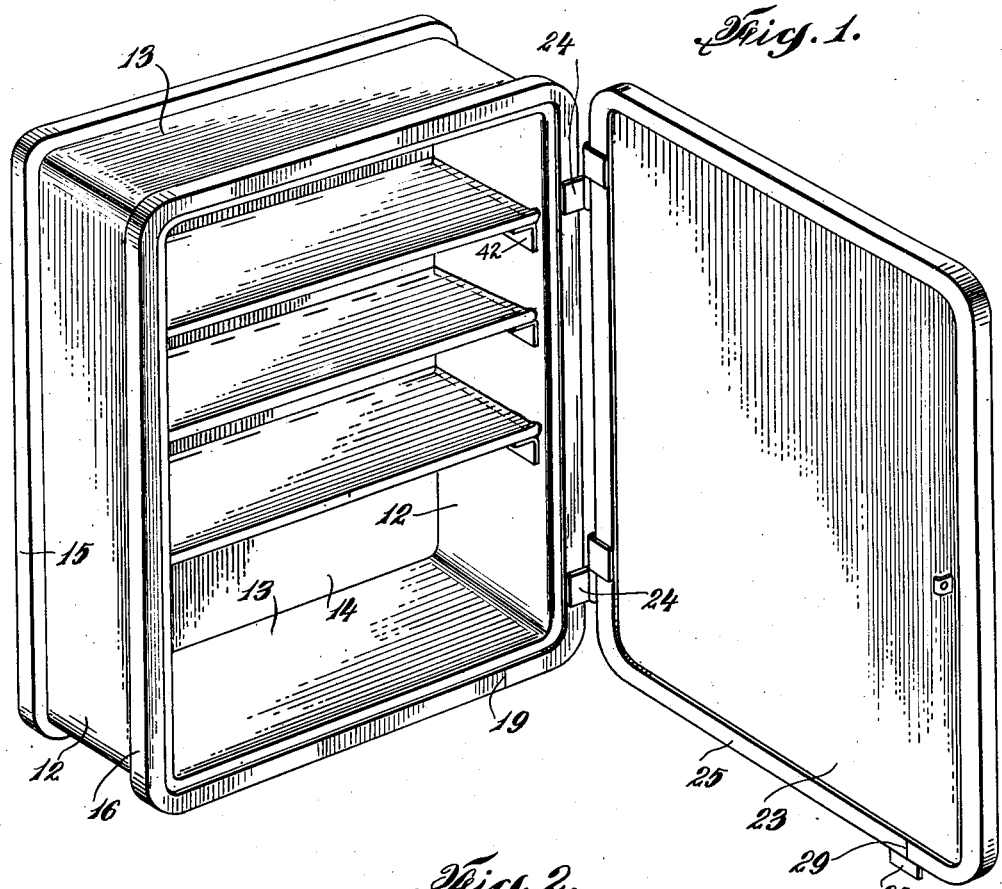
Fig. 1 is a perspective view with the door open of a wall type medicine cabinet for surface mounting.
Figure 2:
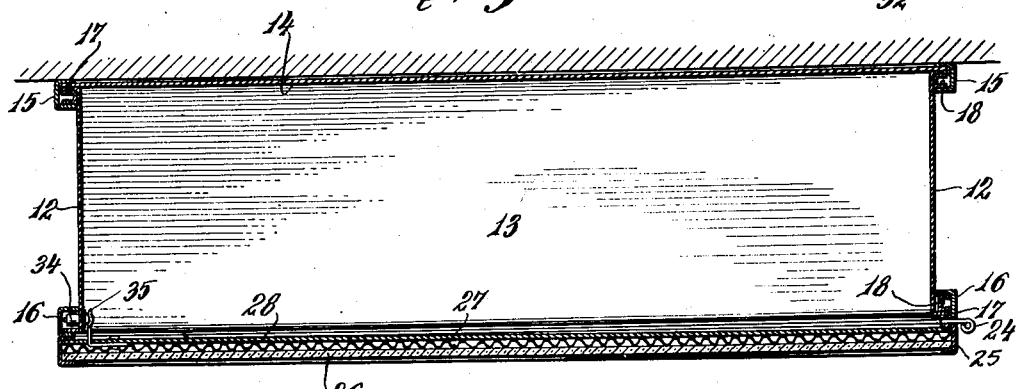
Fig. 2 is a sectional plan taken across the cabinet of Fig. 1 below the bottom shelf.

Referring to Figs. 1 and 2, which relate to the wall type of cabinet adapted for surface mounting, it can be seen that the side walls 12 of the body of the cabinet are integral with the top and bottom walls 13, but are separate from the rear wall 14. The rear bead 15, which is channel shaped, is preferably given a chromium plate finish while the walls 12, 13 and 14 are preferably porcelain enameled. Similarly the front bead 16 is channel shaped and is preferably given a chromium plate finish. It is to be understood however that the walls 12, 13 and 14 may have other finishes. Also both beads may have other finishes and may even be porcelain enameled.

Walls 12 and 13 are provided with flanges 17 projecting substantially at right angles therefrom at both their front and rear edges, said flanges being integral with the walls and of the same thickness of metal. Inside of beads 15 and 16, between flanges 17 and one leg of said beads are located spacing channels 18 (Figs. 2, 3, 4, 7 and 8). Bead 16 is made of one piece and slit as at 19 (Figs. 1 and 7). In assembling bead 16 on the body of the cabinet, said bead is sprung open and over flanges 17 and spacing channels 18. The ends are then pulled together and spliced to each other as explained hereinafter. Spacing channels 18 are made up of several lengths (said lengths not being shown) located around the cabinet body and inside of bead 16. Said spacing channels are not fastened to either the bead or the cabinet body, they are just set in the bead. For simplicity of manufacture, spacing channels 18 do not extend around the corner bends of the cabinet. The spacing channel on the top of top wall 13, for example, extends across the width of the cabinet, but stops short of the curve of the corners on either side.

Bead 15 is mounted in a manner similar to that used for bead 16, except in the case of the former, the rear leg of the bead comes back of rear wall 14 which rests against the back of flange 17 (Fig. 2) and is clamped tightly thereto when bead 15 is spliced. Spacing channels 18 are also used in bead 15.

The splice for bead 16 is shown in Figs. 7 and 8. A splice plate 20 extends across slit 19 and is fastened to the abutting ends of the bead by means of screws 21 and 22. Spacing channel 18 is stopped short of splice plate 20. With slit 19 in the position shown in Fig. 1, the spacing channel 18 is omitted for the short stretch between the splice plate and the lower right hand corner of the cabinet. Depending on the finish of the bead, one or two slits are to be used. If the finish of the bead is of porcelain enamel, two slits would be preferable, one at 19 and another somewhere at the top of the cabinet. For a chromium plate finish, slit 19 is enough. In the case of the porcelain enamel finish, two screws as 21 and 22 should be used at a slit, but if chromium plate be used, one end of the splice plate can be welded to the bead and the screw omitted, say screw 22, and the other side of the slit fastened by a screw as at 21.

The splicing for bead 15 is similar to that just described for bead 16.

The door, denoted as a whole by numeral 23, is mounted by hinges 24 which have one leaf welded to bead 16 and the other welded to door frame 25. Fastening the hinges by welding is feasible where bead 16 and door frame 25 have a chromium plate, nickel plate or lacquer finish, but screws must be used if the finish is of porcelain enamel. Door frame 25 is channel shaped in cross-section and is similar to bead 16 (Figs. 2, 3 and 4). Held in door frame 25 is a mirror 26, backed by a corrugated cushion 27. Closing the back of the door is a plate 28. In placing door frame 25 over the mirror 26, cushion 27 and backing plate 28, said frame is sprung apart at slit 29. When once over the parts it is to retain, the ends of door frame 25 are closed together at 29 (Figs. 5 and 6) and fastened together by means of splice plate 30. Where finish other than porcelain enamel is used, as explained above, one portion of splice plate 30 is welded to one of the ends of the door frame, the end to the right of slit 29 in Fig. 5, while the other portion of the splice plate is fastened by means of a screw 31 to the other end of the frame. Door pull 32 is fastened to the door frame by screw 33. In case it should be desired not to weld splice plate 30 to one of the ends of door frame 25, screw 33 can be run up through a hole (not shown) tapped in said plate and serve the double function of fastening said plate to the frame and of holding the door pull 32.

In Fig. 3, bullet catch 34 is shown fastened to the wall 12 with its body projecting into bead 16. A spring latch 35 is screw fastened to backing plate 28 and is adapted to engage the hemispherical head 36 of the catch. Where bullet catch 34 projects into bead 16, spacing channel 18 is omitted for a short stretch.

In Figs. 9 and 10 is shown a recess type cabinet for mounting substantially flush with the wall. The door 37 is of the same construction as that of the cabinet of Fig. 1 and bead 38 is similar to bead 16. In the recess type cabinet, the walls 12, 13 and 14 are pressed up from one piece. In the wall type cabinet (Fig. 2) rear wall 14 is clamped to the other walls by bead 15. This is made necessary because a projection such as flange 17 is required to keep bead 15 in place.

No piece made up of subordinate parts welded together is considered to be of uniform thickness throughout in the sense in which I use these terms. This welding makes porcelain enameling impractical and does not lend the cabinet body to being constructed with a different finish from that given to the bead, say of a porcelain enamel finish for the body, while the bead say is of chromium plate. In the present invention, the cabinet body is preferably given a porcelain enamel finish, and in order to make this feasible all parts which are integral, or made of one piece, are of the same thickness throughout. The shelf brackets 42 are fastened to the cabinet walls by means of screws and not by welding in order to preserve an even thickness of metal.

The terms integral and integrally as used in the claims are used in the sense of being made from one piece, but excludes the idea of a one piece part which is made into a unit by welding. No piece made up of subordinate parts welded together is considered to be of substantially uniform thickness throughout in the sense in which I use these terms.

Figure 11:
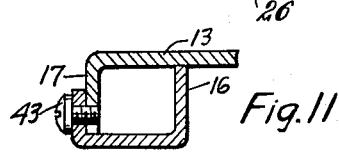
Fig. 11 is a partial section at the bead of an alternate method of clamping the bead to the cabinet body.

The term "clamped" as used in the claims is intended to differentiate from fastening the beads to the cabinet by welding, bending or pressing the bead over into form about a flange on the cabinet or by riveting or by any means that would interfere with porcelain enameling on the cabinet body. It is intended to cover the fastening of the bead as by means of a splice plate or fastening by other means as by using screws for fastening the bead to a flange formed on the cabinet body by means of screws, e. g. Fig. 11. It is to be noted that the clamping method of Fig. 11 requires no channel spacers.

I claim:

1. A medicine cabinet comprising a metallic cabinet body having a flange extending outwardly from the body, a substantially channel shaped bead clamped upon the body over said flange and completely encircling said body, one leg of said bead coming against one side of the flange and the other leg of the bead coming on the other side of the flange, and a channel shaped spacer inside of the bead coming between the flange and the latter leg of said bead for holding said latter leg in spaced relation to the flange.

2. A medicine cabinet comprising a metallic cabinet body having a flange extending outwardly from the front end of the body, a substantially channel shaped bead clamped upon the front end of the body over said flange, the front leg of said bead coming in front of said flange and the rear leg of said bead coming to the rear of the flange, a spacer inside of said bead coming between the rear of the flange and the rear leg of the bead for holding the rear leg of the bead in spaced relation to the flange, a door hingedly mounted on said bead, and a bullet catch mounted in said bead having its catch portion extending out through a wall of the cabinet for cooperating with the door to hold it in closed position, said spacer being omitted from within the bead at the bullet catch.

3. A medicine cabinet comprising a metallic cabinet body open at the front, said body being formed with top, bottom, and side walls having a flange extending upwardly and downwardly respectively from the front ends of the top and bottom walls, and laterally outward from the front ends of the side walls, said flange being formed integrally with the walls, and a substantially channel shaped bead, independent of said flange, mounted upon the cabinet body over said flange, and extending about said body, one leg of the bead coming in front of the flange and the other leg spaced a substantial distance to the rear of same, the distance across the front of the cabinet between the inner edges of the legs on opposite sides of the cabinet being less than the corresponding distance out to out of said flange, but not less, for the leg in front of the flange, than the corresponding distance across the opening of the cabinet body.

4. A medicine cabinet comprising a metallic cabinet body open at the front, said body being formed with top, bottom, and side walls having a flange extending from the front end of said walls in a direction outwardly from the outer planes of said walls, said flanges being integral with said walls, a substantially channel shaped bead, independent of said flange, mounted over said flange, with the flange coming between its legs, said bead extending about said body and being split in length, and means for holding the loose ends of the bead together, one leg of the bead coming in front of the flange and the other spaced a substantial distance to the rear of same, the distance across the front of the cabinet body between the inner edges of the legs on opposite sides of the cabinet being less than the corresponding distance out to out of said flange, but not less, for the leg in front of the flange, than the corresponding distance across the opening of the cabinet body.

5. A medicine cabinet comprising a metallic cabinet body open at the front, said body being formed with top, bottom and side walls having a flange extending from the front end of said walls in a direction outwardly from the outer planes of said walls, said flange being integral with said walls, a substantially channel shaped bead, independent of said flange, mounted upon the cabinet body over said flange, with the flange coming between its legs, said bead extending about said body, one leg of the bead coming directly against the front of the flange and the other leg to the rear of same and spaced a substantial distance therefrom, and spacing means inside of said bead, independent of said flange of said walls, and the bead, said means being located between the rear of the flange and the rear leg of the bead for holding the rear leg of the bead in spaced relation to the flange, the distance across the front of the cabinet between the inner edges of the legs of the bead on opposite sides of the cabinet being less than the corresponding distance out to out of said flange, but not less, for the leg in front of the flange, than the corresponding distance across the opening of the cabinet body.

6. A medicine cabinet comprising a metallic cabinet body open at the front, said body being formed with top, bottom and side walls having a flange extending from the front end of said walls in a direction outwardly from the outer planes of said walls, said flange being integral with said walls, a substantially channel shaped bead, independent of said flange, mounted upon the cabinet body over said flange, with the flange coming between its legs, said bead extending about said body, one leg of the bead coming against the front of the flange and the other leg to the rear of same and spaced a substantial distance therefrom, and a plurality of spacers independent of each other, of the walls, of said flange, and of the bead, said spacers being located between the rear of the flange and the rear leg of the bead for holding the rear leg of the bead in spaced relation to the flange, the distance across the front of the cabinet between the inner edges of the legs of the bead on opposite sides of the cabinet being less than the corresponding distance out to out of said flange, but not less than the corresponding distance across the opening of the cabinet body.

7. A medicine cabinet comprising a metallic cabinet body open at the front, said body being formed with top, bottom and side walls, integral with each other and an independent rear wall, said top, bottom and side walls having flanges extending in an outward direction from both the front and rear ends of said latter walls, said flanges being integral with said latter walls, said rear wall abutting against the rear of the rear flange, a substantially channel shaped bead, independent of the front flange, mounted over the front flange, with the front flange coming between its legs, the rear leg of the bead being spaced a substantial distance back from said flange, said bead extending about said body, the distance across the front of the cabinet between the inner edges of the legs on opposite sides of the cabinet being less than the corresponding distance out to out of the front flange, and a substantially channel shaped bead, independent of the rear flange and the rear wall, mounted over the rear flange and the edges of the rear wall, with the rear flange and the edges of the rear wall coming between the legs of said latter bead, the front leg of said latter bead being spaced a substantial distance in front of the rear flange, the distance across the rear of the cabinet, between the inner edges of the legs of said latter bead, on opposite sides of the cabinet, being less than the corresponding distance out to out of the rear flange, said latter bead holding the rear wall in position on the rear flange.

8. In a medicine cabinet as claimed in claim 7, spacing means inside the bead mounted over the rear flange and the edges of the rear wall, said means being independent of the rear wall, rear flange and said bead and located between the front face of the rear flange and the front leg of said bead.

ALBERT EDGAR BLACKMAN.